(12) United States Patent
Haustein et al.

(10) Patent No.: US 8,898,378 B2
(45) Date of Patent: Nov. 25, 2014

(54) RETENTION MANAGEMENT AND REORDERING THE DATA BASED ON RETENTION TIMES ON TAPE

(75) Inventors: Nils Haustein, Soergenloch (DE); Thorsten Krause, Mainz (DE); Daniel J. Winarski, Tucson, AZ (US)

(73) Assignee: International Business Machines Co, Armonk, NY (US)

( * ) Notice: Subject to any disclaimer, the term of this patent is extended or adjusted under 35 U.S.C. 154(b) by 185 days.

(21) Appl. No.: 13/368,922

(22) Filed: Feb. 8, 2012

(65) Prior Publication Data

US 2012/0212850 A1 Aug. 23, 2012

(30) Foreign Application Priority Data

Feb. 23, 2011 (EP) .................................... 11155543

(51) Int. Cl.
*G06F 13/00* (2006.01)
*G11B 27/11* (2006.01)
(52) U.S. Cl.
CPC .......... *G11B 27/11* (2013.01); *G11B 2220/956* (2013.01); *G11B 2220/90* (2013.01); *G11B 2220/655* (2013.01); *G11B 2220/41* (2013.01)
USPC ........................................................ 711/111
(58) Field of Classification Search
USPC ........................................................ 711/111
See application file for complete search history.

(56) References Cited

U.S. PATENT DOCUMENTS

| 5,525,902 | A | * | 6/1996 | Nakajima et al. | ............. 324/212 |
| 6,983,351 | B2 | | 1/2006 | Gibble et al. | |
| 7,620,765 | B1 | | 11/2009 | Ohr et al. | |
| 7,870,104 | B2 | * | 1/2011 | Fujii et al. | ................... 707/689 |
| 2002/0138693 | A1 | * | 9/2002 | Aasland | ........................ 711/112 |
| 2004/0073768 | A1 | * | 4/2004 | Bottemiller et al. | ......... 711/207 |
| 2005/0055518 | A1 | * | 3/2005 | Hochberg et al. | ............. 711/159 |
| 2006/0282629 | A1 | | 12/2006 | Stuart et al. | |
| 2007/0103984 | A1 | * | 5/2007 | Kavuri et al. | ............ 365/185.17 |
| 2009/0164525 | A1 | * | 6/2009 | Krishnaswamy et al. | ..... 707/202 |
| 2010/0318559 | A1 | * | 12/2010 | Yan et al. | ....................... 707/769 |
| 2011/0010495 | A1 | * | 1/2011 | Haustein et al. | ............... 711/111 |
| 2011/0122522 | A1 | * | 5/2011 | Itagaki et al. | ..................... 360/15 |
| 2012/0005391 | A1 | * | 1/2012 | Byrne et al. | .................... 710/313 |
| 2013/0080418 | A1 | * | 3/2013 | Kashyap | ....................... 707/718 |

* cited by examiner

*Primary Examiner* — Charles Rones
*Assistant Examiner* — Nanci Wong
(74) *Attorney, Agent, or Firm* — DeLizio Gilliam, PLLC (57) ABSTRACT

Retention management for data stored in data blocks on a tape is provided. A block mapping table has entries each of which include an expiration date for data blocks stored on the tape. The entries of the block mapping table may be sorted in accordance with at least one sorting criterion. Data blocks on the tape are rearranged according to the block mapping table. The block mapping table is then stored, either on the tape or in a memory associated with the tape.

19 Claims, 5 Drawing Sheets

RETENTION MANAGEMENT AND REORDERING THE DATA BASED ON RETENTION TIMES ON TAPE

RELATED APPLICATIONS

This application claims the priority benefit of European Application No. 11155543.9 filed Feb. 23, 2011.

BACKGROUND

Embodiments of the inventive subject matter generally relate to the field of computer storage systems and, more particularly, to retention management for data stored on a tape.

Laws and regulations may require retaining data for a certain period of time whereby data shall not be deleted or changed during the retention period.

Many storage systems exist that offer such functionality. Once the data is stored in the storage system and on the medium a retention period is assigned, the storage system may ensure that the data cannot be deleted or changed during the retention period. When the retention period has expired the data may be allowed to be deleted and storage capacity may be freed up to be reused.

Typically, archiving applications, such as enterprise content management systems (ECM) or document management systems (DMS), manage the retention period of their data. When the data is stored, the ECM system may instruct the storage system about the retention period, the storage system may apply it and may prevent deletion or modifications. During the lifecycle of the data retention, an ECM application may prolong the retention which may then be implemented by functions according to prior art storage systems. When the retention period has expired, the ECM system may instruct the storage system to delete the data.

WORM (write once, read many) tape may be compliant with the linear tape-open (LTO) standard—such as LTO3, LTO4 and LTO5, as well as the IBM System Storage TS1100™ tape drive and the Oracle T10000 tape drive with Volsafe™ technology. Such systems may provide retention protection in a way that the data, which is stored on the WORM tape, may never be deleted. This means that even if the retention period of a document (data) may have expired the data cannot be deleted. Upon expiration of all data on a WORM tape, the entire tape may be shredded. This can be a disadvantage because resources are wasted. Another disadvantage is that a WORM tape may not be re-written again, even if all data or a subset of data has expired.

Tape systems according to the prior art typically comprise one type of network interface that may be used for reading and writing data. The network interface can typically be implemented by Fibre Channel or Serial Attached SCSI (SAS). Another type of network interface for servicing a tape system or performing systems management activities such as firmware updates may be based on an Ethernet connection.

SUMMARY

System, method and computer program product embodiments provide for retention management for data stored in data blocks on a tape. A block mapping table has entries each of which include an expiration date for a respective data block stored on the tape. The entries of the block mapping table are sorted in accordance with at least one sorting criterion, for example, in a descending order. The data blocks on the tape may be rearranged according to the block mapping table. The block mapping table can be stored on the tape or on a memory in or on a tape cartridge.

The aspects defined above and further aspects of the embodiments of the inventive subject matter are apparent from the examples of embodiments to be described hereinafter and are explained with reference to the examples of embodiments, but to which the invention is not limited.

BRIEF DESCRIPTION OF THE DRAWINGS

The present embodiments may be better understood, and numerous objects, features, and advantages made apparent to those skilled in the art by referencing the accompanying drawings.

The embodiments will now be described, by way of example and with reference to the following drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The various embodiments described herein may improve retention management on data stored on tapes or cartridges (which may include the tape). The novel systems and methods may ensure that during defined retention periods, data stored on the tape is not deleted. However, if the retention period has expired for a specific data block the novel method provides for selectively deleting expired data by rearranging the data on the tape. The tapes may be reused and thus, also contribute to protecting the environment for a smarter planet.

In the context of this application, the following terms are used:

Retention management—The term data retention may denote policies of persistent data and records management for meeting legal and business data archival requirements. A data retention policy may weigh legal and privacy concerns against economics and may need to determine retention time, archival rules, data formats, and permissible means of storage, access, and encryption. Retention management may specify a retention period. It may represent the period of time a document may be kept or "retained". At the expiration of the retention period, the document may usually be destroyed. The retention period may vary for different types of records or data. For example, business incorporation documents may have a permanent retention period (meaning that they may be retained indefinitely and never be destroyed), but receipts for tax-deductible purchases by an individual taxpayer usually may have defined retention periods, e.g., a three-year retention period. The length of the retention period may be based on the likelihood that the document may be needed at some point in the future.

Retention period—The term retention period may denote a period of time in which the data is to be retained and may not be deleted or changed. The period of time may have a starting date and time which usually may be the date and time the data may have been archived and stored; and it may have an ending date and time, which may be the point in time when the data may expire and may be deleted. The ending date and time may be the retention time.

Retention time—The term retention time may denote a point in time when an information element, e.g., a data block on a tape will be expired. The retention time may be the sum of an actual time and the retention period. A time reference may be used in order to provide the actual time.

Tape—The term tape may denote a recording media and thus, a magnetic tape. A magnetic tape may be a medium for magnetic recording, made of a thin magnetic coating on a long, narrow strip of plastic. Tapes may be used in data centers for archiving data. All kinds of digital data may be stored on tapes, e.g., transaction data from enterprise applications, text, audio, images or video data. The recording or storing of data on the tape may be performed in many different tracks. Modern tapes may provide more than 1000 tracks in parallel. The tape may be packaged in a cartridge.

Cartridge—The term cartridge may denote a casing comprising a magnetic tape, often with a defined length. The cartridge may be made from plastic such as polycarbonate, and have either one or two reels of tape. If the tape cartridge has only one reel, there is a second reel, called a machine reel, in the tape drive. The cartridge may be inserted into a tape drive. The tape may not be removed from the tape drive for reading or writing. The casing may also be used to mark the tape inside by writing notes onto the casing or by bar code or RFID (radio frequency identification) tags.

Block mapping table—A block mapping table or retention block mapping table may denote a table listing blocks on the tape and related retention times. Because blocks may be written sequentially onto the tape, i.e., with ascending block number, blocks having the same retention time may be grouped together.

Current position—The term current position may denote the position of the read/write head of a tape drive that may relate to the current physical position of the head in relationship to the tape.

In the following, a detailed description of the drawings will be given. All illustrations in the drawings may be schematic. Firstly, a block diagram of a method for retention management for data stored in data blocks on a tape will be described. Afterwards, several method, system components and related elements will be described.

Figure 1:
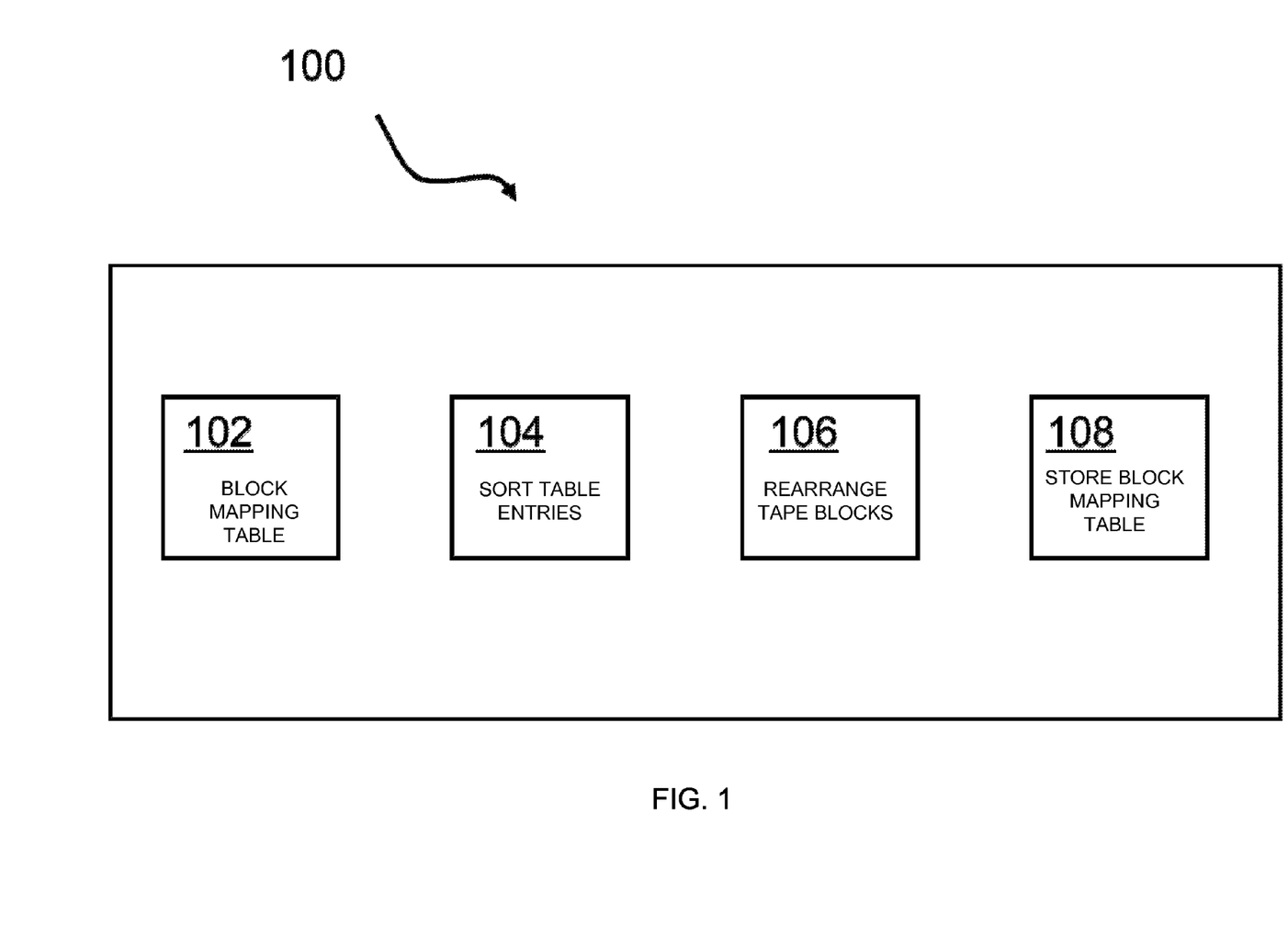
FIG. 1 shows a block diagram of a method for managing retention according to embodiments.

FIG. 1 is a block diagram of an embodiment of the inventive method. The method 100 for retention management for data stored in data blocks on a tape includes maintaining, 102, a block mapping table having entries each of which includes an expiration date for a respective data block or data blocks stored on the tape.

The method further includes sorting, 104, the entries of the block mapping table in accordance with at least one sorting criterion. The sorting of the block mapping table may comprise sorting the entries according to date and time. In some embodiments, the sorting criterion may be a descending order. Technically, it may be desirable to copy the block mapping table to a second table, sort the second table and then update the original block mapping table with the sorted entries. The second table may only be a temporary data construct.

The method further includes rearranging, 106, the data blocks on the tape according to the block mapping table. Moreover, the method includes storing, 108, the block mapping table.

It should be noted that the block mapping table may be stored in a protected area of the tape. According to one embodiment of the method, the storing of the block mapping table may comprise storing the block mapping table to a reserved area on the tape. This area may be at the beginning of the tape. This may ensure that the data blocks stored on the tape and the mapping tables may always be stored together. Alternatively, the block mapping table may be mapped into a memory attached to a cartridge of the tape. This memory may be an EEPROM (Electrically Erasable Programmable Read Only Memory) or another type of non-volatile memory. The memory may be part of an RFID chip attached to the cartridge.

In some embodiments, writing the data block to the tape may include updating the block mapping table, for example, at the reserved location of the tape or in the internal memory of cartridge. In particular, the block addresses of the data blocks written to the tape and newly calculated expiration dates may be added to the block mapping table. Data blocks which may have been overwritten may be deleted from the block mapping table.

In some embodiments, the block mapping table is loaded from the reserved area of the tape or the memory attached to the cartridge of the tape to an internal memory of a tape drive when tape is loaded into a tape drive. This is desirable because it helps assure that the system is using the latest available data. This is also desirable because no extra command for reading the block mapping table from the tape is utilized.

In some embodiments, the block mapping table is written from an internal memory of a tape drive to the reserved area of the tape from or the memory attached to the cartridge of the tape when the tape is unloaded from a tape drive. This is desirable as it may ensure that the latest block mapping table data is stored with the data block on the tape. As indicated above, in some embodiments the table may be initially read after a tape has been re-inserted to a tape drive.

Figure 2:
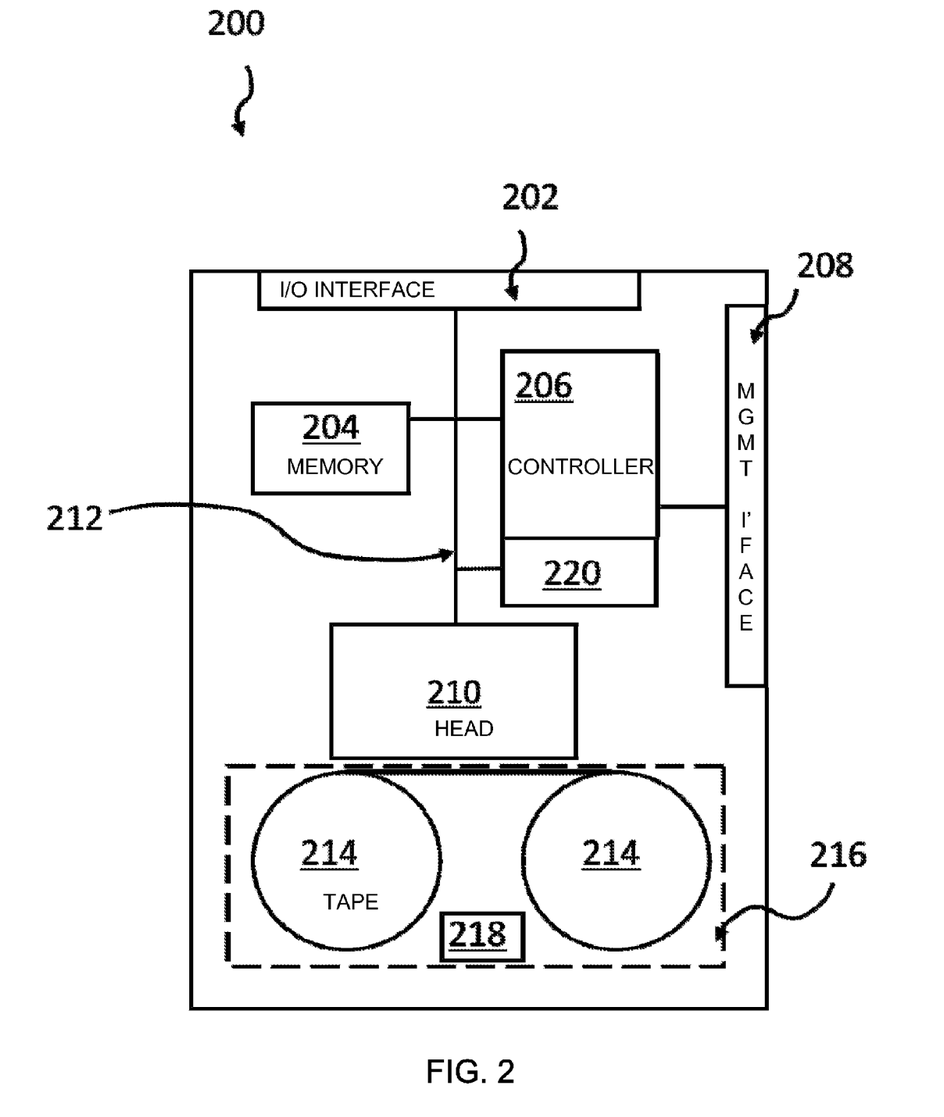
FIG. 2 a tape drive with a retention management unit according to embodiments.

FIG. 2 shows a tape drive 200 according to embodiments. The tape drive includes an I/O interface (input/output) 202 for data and commands. The interface may be attached to a network (not shown) which may be connected to a host system. The host system (not shown) may run a storage management application. An internal memory 204 of the tape drive 200 may be used as buffer for data blocks.

Furthermore, the tape drive 200 may include a management interface 208 which may be connected to a controller 206. Furthermore, a read/write assembly or head 210 may be attached to an internal bus 212. Also the I/O interface 202, the internal memory 204 as well as the controller 206 may be attached to the bus 212. The head 210 includes one or more read/write heads for reading data from or writing data to the tape 214. Read heads may comprise anisotropic magnetoresistive (AMR), giant magnetoresistive (GMR), and tunnel magnetoresistive (TMR) sensors. The tape 214, shown spooled on reels, may be included in a cartridge 216. There may be an additional memory 218 such as an RFID memory in or on the cartridge, for storing data. Such data may include the block mapping table or block mapping tables.

Additionally, a retention management unit 220 may be included into the tape drive. The retention management unit 220 may be integrated into the controller 206 or, it may be implemented as retention management unit 220 that is provided in addition to and separate from the controller 206 and having its own connection to the bus 212. Other implementation options may exist for the retention management unit 220.

Figure 3:
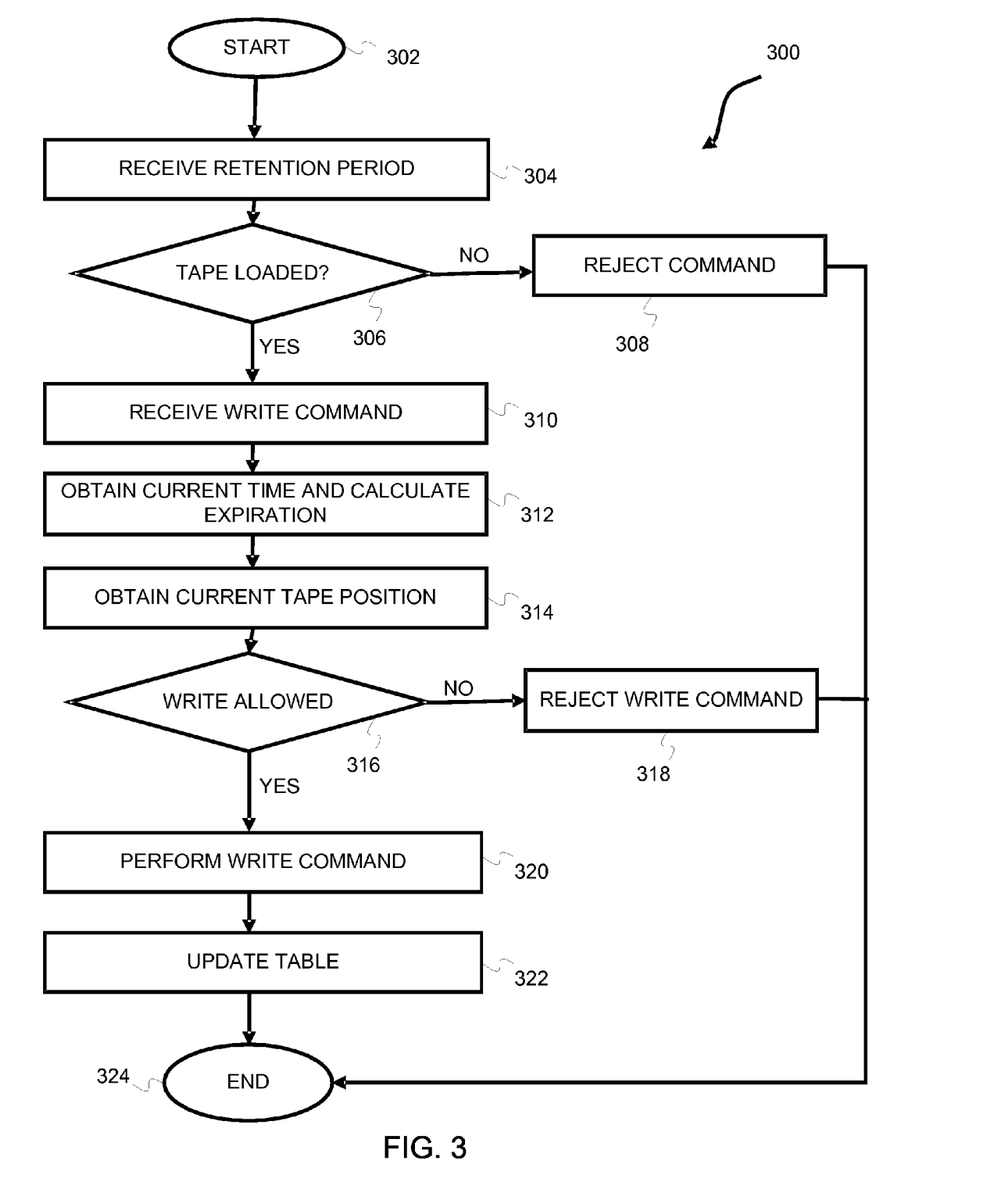
FIG. 3 is a flow chart for a write command according to embodiments.

FIG. 3 illustrates a flow chart for a novel method 300 for write command processing on a retention managed tape. Method 300 begins at block 302 and continues to block 304, where in some embodiments, a SET TIMESTAMP command, as explained below is received that includes a retention time. The method 300 may check if a tape is loaded at block 306 and if this is not the case, the SET TIMESTAMP command is rejected at block 308 and the method proceeds to ending block 324.

In some embodiments, method 300 ensures that no data is overwritten as long as the retention time for the related data has not expired. This can aid in providing WORM protection. Upon determining that data beyond the current block address has expired, the retention management module may allow overwriting data and consequently, reclaiming space on a retention protected tape. This means that new data with new retention periods may be added at the end of the already written data blocks on the tape which may not have expired.

If a tape has been loaded at block 306 then the method 300 may continue to block 310, where a write command is received, such as the write command shown in the following Table 1:

TABLE 1

| | | | Write Command | | | | | |
|---|---|---|---|---|---|---|---|---|
| | | | | bits | | | | |
| Byte | 7 | 6 | 5 | 4 | 3 | 2 | 1 | 0 |
| 0 | | | | operation code (4 Ah) | | | | |
| 1 | obsolete | | | | reserved | | | fixed |
| 2 | | | | transfer length | | | | |
| . | | | | | | | | |
| . | | | | | | | | |
| . | | | | | | | | |
| 4 | | | | | | | | |
| 5 | | | | control | | | | |

At block 312, the method obtains the current time. In some embodiments, the method may obtain a current time stamp from a time source such as an NTS (network time server). Alternatively, the method may obtain the current time for a clock maintained by the system running the method. After obtaining the time, the method calculates an expiration date and time. In some embodiments, the expiration date and time may be calculated by adding the retention period obtained at block 304 to the current date and time obtained at block 312.

At block 314, the method 300 determines the current block position on the tape. At block 316, the method 300 uses the retention block mapping table—as shown below—to determine if the expiration time (column 2 of table 1) of all data block addresses (column 1 of table 1) that are greater or equal to the current block position, are less than or equal to the current time stamp determined at block 312. That is, the method determines if all blocks after the current position have expired. Hence, all data blocks with an address subsequent to the current block address of the tape may have to be expired prior to the execution of the write command. In particular, a status signal "successful" may be generated if all blocks after the current position have expired. This may be used to signal a control system that the storage of data with retention times on the tape was successful.

An example of a retention block mapping table is given in the following Table 2:

TABLE 2

| Retention Block Mapping | |
|---|---|
| block address | expiration time |
| 0-102 | 31.12.2018 00:00:00 |
| 103-220 | 13.09.2013 13:00:00 |
| 212-353 | 27.05.2015 10:00:00 |

The retention-block mapping table is used to map the block addresses of the data (column 1) to an expiration time (column 2). According to the example table's second row, all data written to block addresses 0-102 expires on 31.12.2018 at 00:00:00. All data written to block addresses 103-220, expires on 13.09.2013 at 13:00:00 (row 3) and all data written to block addresses 221-353, expires on 27.05.2015 10:00:00 (row 4).

If the result of the determination (block 316) of method 300 is "no" then the write command is rejected at block 318 and the method may end at block 324. In some embodiments, the method may comprise generating an error message responsive to the write command if the verifying fails to determine that all data blocks with an address subsequent to the current block address of the tape have expired. Otherwise, if the result of the determination at block 316 is "yes", then the method 300 may continue to step 320 and may perform the write command received at block 310. Subsequently, at block 322 the method may update the retention block mapping table by adding the block addresses written by the write command to column 1 of Table 2 above and the expiration date and time to column 2 of Table 2 at the same row. The expiration date and time may be calculated based on the current time stamp received at block 312 plus the retention period received at block 304. At block 324 the method ends.

The above mentioned SET TIMESTAMP command may be modified. In some embodiments, an I/O command allows a host system to set retention times for data blocks written to tape. One way for a host system to set the retention period for data blocks being written may be the SET TIMESTAMP command which may be standardized for e.g., an LTO Ultrium tape drive. An example SET TIMESTAMP command is shown in the following two tables and may be sent by a host system to a tape drive when a tape is mounted. In some embodiments, the SET TIMESTAMP command causes subsequent written data blocks to inherit the retention time period given by the SET TIMESTAMP command.

This SET TIMESTAMP command may be modified allowing the application to send a retention period instead of a time stamp in the parameter list. An example SET TIMESTAMP command according to the LTO SCSI specification with one modification in Byte 1, bit 7 is shown in Table 3:

TABLE 3

| | | | SET TIMESTAMP with Byte 1, Bit 7 Modified | | | | | |
|---|---|---|---|---|---|---|---|---|
| | | | | Bits | | | | |
| Byte | 7 | 6 | 5 | 4 | 3 | 2 | 1 | 0 |
| 0 | | | | operation code (4 Ah) | | | | |
| 1 | | reserved | | | service action (to be defined) | | | |
| 2 | | | | reserved | | | | |
| ... | | | | | | | | |
| 5 | | | | | | | | |

TABLE 3-continued

SET TIMESTAMP with Byte 1, Bit 7 Modified

| Byte | Bits | | | | | | | |
|---|---|---|---|---|---|---|---|---|
| | 7 | 6 | 5 | 4 | 3 | 2 | 1 | 0 |
| 6 ... 9 | parameter list length | | | | | | | |
| 10 | reserved | | | | | | | |
| 11 | control | | | | | | | |

Command code A4h (byte 0 in this example) indicates that this is a SET TIMESTAMP command. Reserved Byte 1 bit 7 may be used to indicate that this command may instruct the tape drive to apply the retention time given in the parameter list to all subsequent written data blocks. The "parameter list length" in bytes 6 to 7 may define the number of bytes sent subsequently as SET TIMESTAMP parameters (see table). Accordingly, an example of the SET TIMESTAMP parameters is shown in the following Table 4:

TABLE 4

TIMESTAMP Parameters (Bytes 4-9)

| byte | Bits | | | | | | | |
|---|---|---|---|---|---|---|---|---|
| | 7 | 6 | 5 | 4 | 3 | 2 | 1 | 0 |
| 0 | | | | Reserved | | | | |
| 1 | | | | Reserved | | | | |
| 2 | | | | Reserved | | | | |
| 3 | | | | Reserved | | | | |
| 4 | | | | (MSB) | | | | |
| | TIMESTAMP | | | | | | | |
| | | | | | | | | (LSB) |
| 10 | | | | Reserved | | | | |
| 11 | | | | Reserved | | | | |

In some embodiments, the TIMESTAMP (bytes 4-9) specifies the retention period for all subsequent written blocks (write commands) in milliseconds. This time period may be relative to the current time stamp which the tape drive may obtain via an NTS.

Figure 4:
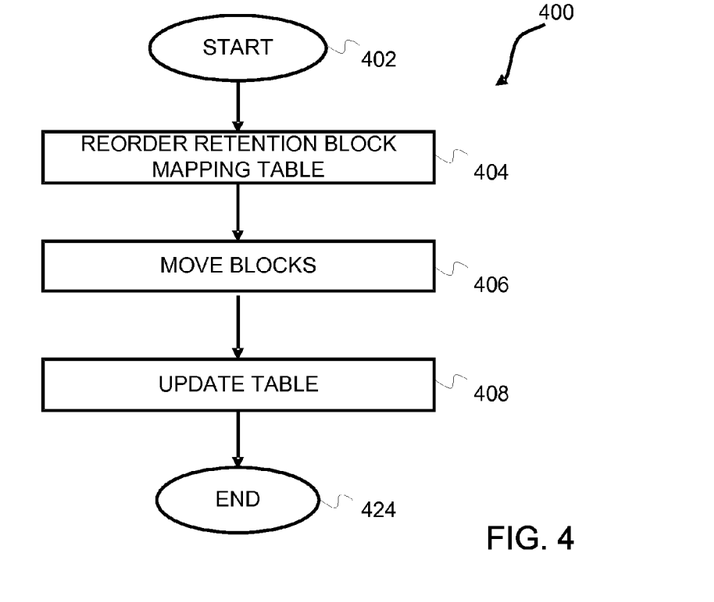
FIG. 4 is a flow chart of a reordering method according to embodiments.

FIG. 4 illustrates a flow chart for optimizing the arrangements of data blocks on the tape. The retention management unit may also perform an optimization of the arrangements of data blocks based on the expiration time. This optimization performed by some embodiments is shown in method 400. Method 400 starts at block 402 and may continue to block 404, where the method 400 sorts the retention block mapping table based on the expiration time. In some embodiments, the block mapping table is sorted in descending order.

At block 406, the method moves the blocks with the latest expiration date to the beginning of the tape and the data blocks with the earliest expiration date to the end of the tape according to the sorted and possibly shortened block mapping table generated at block 404. At block 408, the method updates the retention block mapping table with the new block addresses.

In some embodiments, method 400 ensures that data blocks with the longest retention time are placed at the beginning of the tape and data blocks with a shorter retention period—including data blocks that have already been expired—are placed at the end of the tape. In such embodiments, the data with the shortest retentions times may be stored more to the end of the tape. This way, the tape may be used to overwrite the data which has been expired because such data is placed at the end of the tape.

Optionally, in some embodiments the method may include additional operations in-between block 404 and block 406, wherein the entries of the stored block mapping table, which may be expired, are deleted from the table. A desirable feature of such embodiments is that data blocks which are expired are not re-arranged on the tape. This may save time for the rearrangement process. A further desirable feature is that the table size may be smaller and easier to handle.

In some embodiments, the rearranging of data blocks may comprise reading all data blocks from the tape for which entries exist in the block mapping table. The reading from the tape may be done in an order defined by the block mapping table. The data blocks may be stored in an internal memory of the tape drive or a memory external to the tape drive. Furthermore, in such embodiments the read data blocks may be written from a beginning of the tape and thereafter the block mapping table is updated with the new block addresses. A sorting may no longer be required because the data blocks have been read in a sorted way already.

Figure 5:
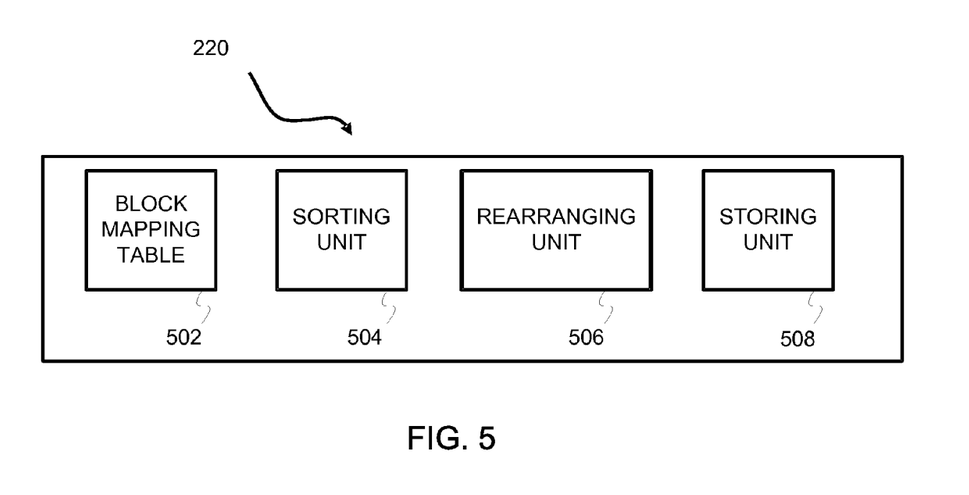
FIG. 5 illustrates a retention management unit according to embodiments.

FIG. 5 is a block diagram illustrating an inventive retention management unit 220 according to embodiments of the inventive subject matter. A retention management unit 220 for data stored in data blocks on a tape 214 includes a providing unit 502 adapted for providing a block mapping table having entries each of which include an expiration date for a respective data block stored on the tape, a sorting unit 504 adapted for sorting the entries of the block mapping table in accordance with at least one sorting criterion, a rearranging unit 506 adapted for rearranging the data blocks on the tape according to the block mapping table, and a storing unit 508 adapted for storing the block mapping table.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon. Some embodiments may be implemented as part of a hypervisor.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
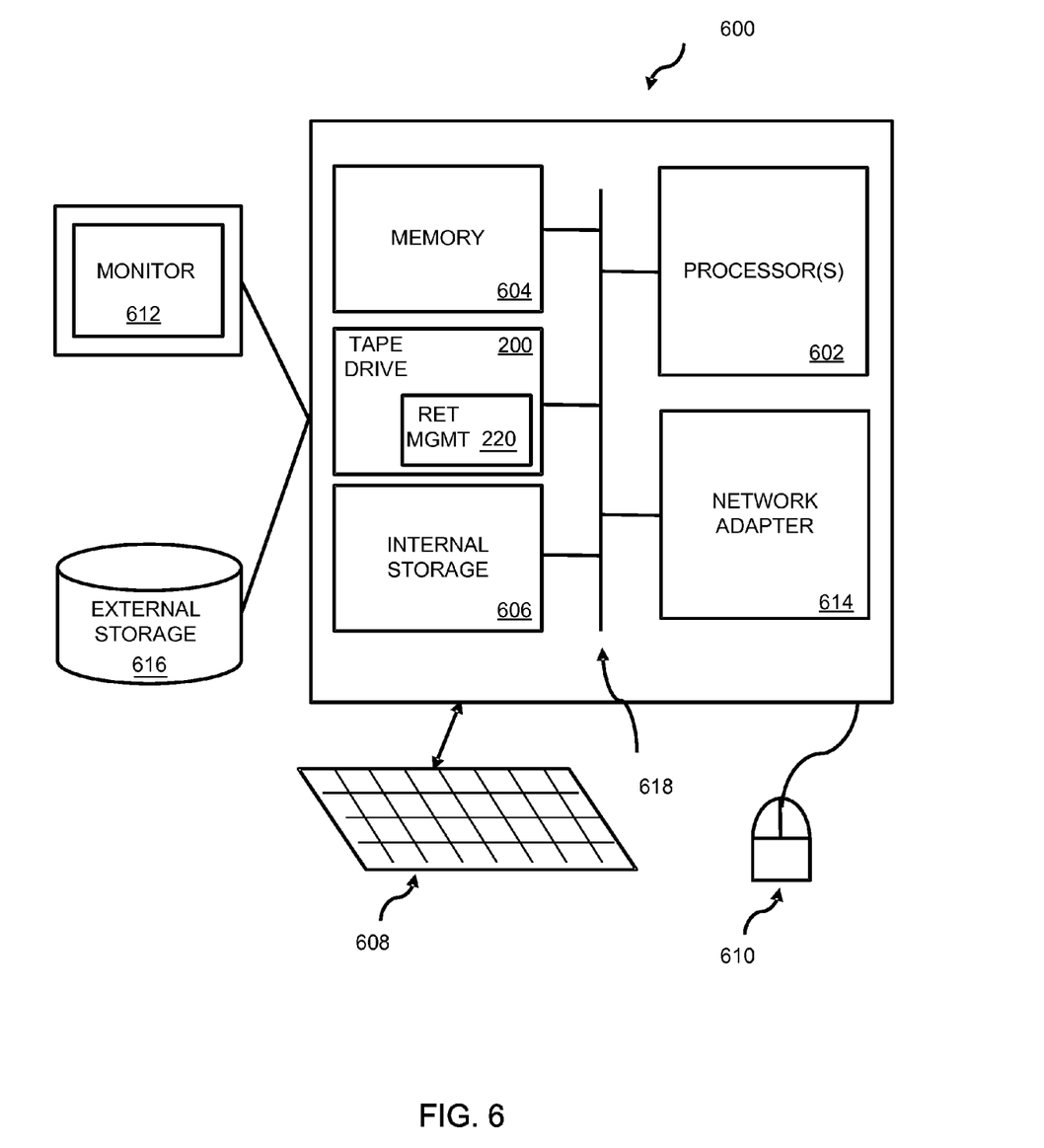
FIG. 6 shows a computer system with a tape drive comprising the retention management unit according to embodiments.

Embodiments of the inventive subject matter may partly be implemented on virtually any type of computer, regardless of the platform being used suitable for storing and/or executing program code. For example, as shown in FIG. 6, a computer system 600, includes one or more processor(s) 602 with one or more cores per processor, associated memory elements 604, an internal storage device 606 (e.g., a hard disk, an optical drive such as a compact disk drive or digital video disk (DVD) drive, a flash memory stick, a solid-state drive, etc.), and numerous other elements and functionalities typical of today's computers (not shown). The memory elements 604 may include a main memory, employed during actual execution of the program code, and a cache memory, which provides temporary storage for at least some program code or data in order to reduce the number of times that code is retrieved from external bulk storage 616 for execution. Elements inside the computer 600 may be linked together by means of a bus system 618 with corresponding adapters. Additionally, a tape drive 200 including retention management unit 220 may be coupled to the bus 618. Alternatively, the tape drive 200 comprising the retention management unit 220 may be coupled via a network to the computer 600.

The computer system 600 may also include input means, such as a keyboard 608, a mouse 610, or a microphone (not shown). Furthermore, the computer 600 may include output means, such as a monitor 612 [e.g., a liquid crystal display (LCD), a plasma display, a light emitting diode display (LED), or a cathode ray tube (CRT) monitor]. The computer system 600 may be connected to a network (e.g., a local area network (LAN), a wide area network (WAN), such as the Internet, or any other similar type of network, including wireless networks via a server network adapter 614 and/or storage system 218. This may allow a coupling to other computer systems. Those, skilled in the art will appreciate that many different types of computer systems exist, and the aforementioned input and output means may take other forms. Generally speaking, the computer system 600 may include at least the minimal processing, memory and input and/or output means for practicing embodiments of the invention.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Further, those skilled in the art will appreciate that one or more elements of the aforementioned computer system 600 may be located at a remote location and connected to the other elements over a network. Further, embodiments may be implemented on a distributed system having a plurality of nodes, where various functions used in the embodiments are located on different nodes within the distributed system. In some embodiments, the node corresponds to a computer system. Alternatively, the node may correspond to a processor with associated physical memory. The node may alternatively correspond to a processor with shared memory and/or resources or a smartphone.

While the inventive subject matter has been described with respect to a limited number of embodiments, those skilled in the art having the benefit of the disclosure, will appreciate that other embodiments may be devised, which do not depart from the scope of the invention as disclosed herein. Accordingly, the scope of the invention should be limited only by the attached claims.

It should also be noted that the terms "comprising" or "including" do not exclude other elements or steps and "a" or "an" does not exclude a plurality. Also, elements described in association with different embodiments may be combined.

What is claimed is:

1. A method for retention management for data stored on a tape, the method comprising:
   maintaining a block mapping table having entries, the entries including an expiration date for one or more data blocks stored on the tape, wherein the entries comprise at least one entry for a data block of the one or more data blocks that has expired based on the expiration date;
   sorting the entries of the block mapping table such that the entries are sorted according to date and time in a descending order;
   rearranging the data blocks on the tape according to the block mapping table, such that the data blocks are stored on the tape according to the data and the time in the descending order;
   storing the block mapping table; and
   generating the expiration date by performing operations including:
      receiving a retention period;
      receiving a write command for writing a data block to the tape;
      determining the expiration date for the data block to be written to the tape based on a current time stamp and the retention period;
      identifying a current block address of the tape where the data block is to be written based on expiration date; and
      verifying that data blocks with block addresses that have values greater than or equal to the current block address have expired relative to the current time stamp using the block mapping table;
   writing the data block to the tape if the verifying determines that all data blocks having values greater than or equal to the block address subsequent to the current block address of the tape have expired relative to the current time stamp;
   updating the block mapping table to include an entry for the data block, in response to writing the data block to the tape; and
   resorting, after the updating of the block mapping table, the entries of the block mapping table such that the entries are sorted according to the date and the time in the descending order.

2. The method according to claim 1, and further comprising generating an error message if the verification determines that data blocks having an address subsequent to the current block address have not expired.

3. The method according to claim 1, wherein the rearranging comprises:
   reading data blocks from the tape for which entries exist in the block mapping table; and
   writing the read data blocks from a beginning of the tape.

4. The method according to claim 3, and further comprising deleting entries from the block mapping table having expired expiration dates.

5. The method according to claim 1, and further comprising, in response to loading a tape into a tape drive, loading the block mapping table from a reserved area of the tape or a memory attached to a cartridge of the tape to an internal memory of the tape drive.

6. The method according to claim 1, and further comprising, in response to unloading a tape from a tape drive, writing the block mapping table from an internal memory of the tape drive to a reserved area of the tape or from a memory attached to a cartridge of the tape.

7. An apparatus comprising:
   a retention management unit for managing data stored in data blocks on a tape, the retention management unit including:
      a block mopping table baying entries each of which comprise an expiration date for a respective data block stored on the tape, wherein the entries comprise at least one entry for a data block of the one or more data blocks that has expired based on the expiration date,
      a sorting unit configured to sort the entries of the block mapping table such that the entries are sorted according to date and time in a descending order,
      a rearranging unit configured to rearrange the data blocks on the tape according to the block mapping table, such that the data blocks are stored on the tape according to the data and the time in the descending order, and
      a storing unit configured to store the block mapping table; and
      a unit configured to generate the expiration date by performing operations including:
         receive a retention period;
         receive a write command for writing a data block to the tape;
         determine the expiration date for the data block to be written to the tape based on a current time stamp and the retention period;
         identify a current block address of the tape where the data block is to be written based on expiration date; and
         verify that data blocks with block addresses that have values greater than or equal to the current block address have expired relative to the current time stamp using the block mapping table,
      wherein the unit is further configured to,
         write the data block to the tape if the verify determines that all data blocks having values greater than or equal to the block address subsequent to the current block address of the tape have expired relative to the current time stamp;
         update the block mapping table to include an entry for the data block, in response to writing the data block to the tape; and
         resort, after the update of the block mapping table, the entries of the block mapping table such that the entries are sorted according to the date and the time in the descending order.

8. The apparatus according to claim 7, and further comprising a tape drive including the retention management unit.

9. The apparatus according to claim 7, wherein the storing unit is configured to store the block mapping table to a reserved area on the tape or to a memory coupled to a cartridge for the tape.

10. An apparatus comprising:
    one or more processors;
    a computer readable storage medium having computer usable program code for the one or more processors embodied therewith, the computer usable program code comprising a computer usable program code configured to:
       maintain a block mapping table having entries, the entries including an expiration date for one or more data blocks stored on a tape, wherein the entries comprise at least one entry for a data block of the one or more data blocks that has expired based on the expiration date;

sort the entries of the block mapping table such that the entries are sorted according to date and time in a descending order;

rearrange the data blocks on the tape according to the block mapping table, such that the data blocks are stored on the tape according to the data and the time in the descending order;

store the block mapping table; and generate the expiration date by performing operations including:

receive a retention period;

receive a write command for writing a data block to the tape;

determine the expiration date for the data block to be written to the tape based on a current time stamp and the retention period;

identify a current block address of the tape where the data block is to be written based on expiration date; and verify that data blocks with block addresses that have values greater than or equal to the current block address have expired relative to the current time stamp using the block mapping table;

write the data block to the tape if the verifying determines that all data blocks having values greater than or equal to the block address subsequent to the current block address of the tape have expired relative to the current time stamp;

update the block mapping table to include an entry for the data block, in response to writing the data block to the tape; and resort after the updating of the block mapping table, the entries of the block mapping table such that the entries are sorted according to the date and the time in the descending order.

11. The apparatus according to claim 10, wherein the computer usable program code further comprises computer usable program code configured to generate an error message if the verification determines that data blocks haying an address subsequent to the current block address have not expired.

12. The apparatus according to claim 10, wherein the computer usable program code configured to rearrange the data blocks comprises computer usable code configured to:

read data blocks from the tape for which entries exist in the block mapping table; and write the read data blocks from a beginning of the tape.

13. The apparatus according to claim 10, wherein the computer usable program code further comprises computer usable program code configured to, in response to loading a tape into a tape drive, load the block mapping table from a reserved area of the tape or a memory attached to a cartridge of the tape to an internal memory of the tape drive.

14. The apparatus according to claim 10, wherein the computer usable program code further comprises computer usable program code configured to, in response to unloading a tape from a tape drive, write the block mapping table from an internal memory of the tape chive to a reserved area of the tape or from a memory attached to a cartridge of the tape.

15. A computer program product for retention management for data stored on a tape, the computer program product comprising:

a computer readable storage medium having computer usable program code embodied therewith, the computer usable program code comprising a computer usable program code configured to:

receive a query for data, the query including a deadline for completion;

determine a plurality of access plans for the query; and maintain a block mapping table having entries, the entries including an expiration date for one or more data blocks stored on the tape, wherein the entries comprise at least one entry for a data block of the one or more data blocks that has expired based on the expiration date;

sort the entries of the block mapping table such that the entries are sorted according to date and time in a descending order;

rearrange the data blocks on the tape according to the block mapping table, such that the data blocks are stored on the tape according to the data and the time in the descending order;

store the block mapping table; and generate the expiration date by performing operations including:

receive a retention period;

receive a mite command for writing a data block to the tape;

determine the expiration date for the data block to be written to the tape based on a current time stamp and the retention period;

identify a current block address of the tape where the data block is to be written based on expiration date; and verify that data blocks with block addresses that have values greater than or equal to the current block address have expired relative to the current time stamp using the block mapping table;

write the data block to the tape if the verifying determines that all data blocks having values greater than or equal to the block address subsequent to the current block address of the tape have expired relative to the current time stamp;

update the block mapping table to include an entry for the data block, in response to writing the data block to the tape; and resort, after the updating of the block mapping table, the entries of the block mapping table such that the entries are sorted according to the date and the time in the descending order.

16. The computer program product according to claim 15, wherein the computer usable program code further comprises computer usable program code configured to generate an error message if the verification determines that data blocks having an address subsequent to the current block address have not expired.

17. The computer program product according to claim 15, wherein the computer usable program code configured to rearrange the data blocks comprises computer usable code configured to:

read data blocks from the tape for which entries exist in the block mapping table; and write the read data blocks from a beginning of the tape.

18. The computer program product according to claim 15, wherein the computer usable program code further comprises computer usable program code configured to, in response to loading a tape into a tape drive, load the block mapping table from a reserved area of the tape or a memory attached to a cartridge of the tape to an internal memory of the tape drive.

19. The computer program product according to claim 15, wherein the computer usable program code further comprises computer usable program code configured to, in response to unloading a tape from a tape drive, write the block mapping table from an internal memory of the tape drive to a reserved area of the tape or from a memory attached to a cartridge of the tape.

\* \* \* \* \*